United States Patent [19]

Bayer et al.

[11] 4,387,206
[45] Jun. 7, 1983

[54] CHIRAL POLYSILOXANES, PROCESS FOR THEIR PREPARATION AND USE

[76] Inventors: Ernst Bayer, Bei der Ochsenweide, 7400 Tubingen 1; Hartmut Frank, Karlstr. 30, 7410 Reutlingen 1, both of Fed. Rep. of Germany

[21] Appl. No.: 233,649

[22] Filed: Feb. 11, 1981

[30] Foreign Application Priority Data

Feb. 11, 1980 [DE] Fed. Rep. of Germany ....... 3005024

[51] Int. Cl.³ ............................................. C08G 77/04
[52] U.S. Cl. ........................................ 528/28; 528/33; 528/41; 556/419
[58] Field of Search ........................... 528/28, 33, 41; 556/419

[56] References Cited

U.S. PATENT DOCUMENTS 3,878,168 4/1975 Schank .................................. 528/28

FOREIGN PATENT DOCUMENTS 2740019 3/1979 Fed. Rep. of Germany .

Primary Examiner—Melvyn I. Marquis
Attorney, Agent, or Firm—Bacon & Thomas

[57] ABSTRACT

The present invention concerns new polysiloxanes having Formula I:

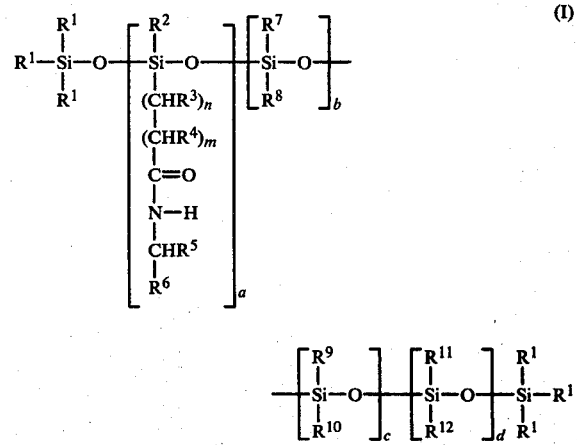

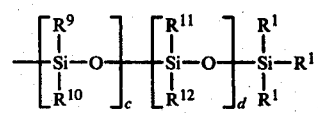

wherein:
$R^1$ and $R^2$ is alkyl,
$R^3$ and $R^4$ are H or an alkyl,
$R^5$ is an alkyl, imidazolylmethyl, indolylmethyl, benzyl, acylamino, or an acylaminobutyl group; and when $R^6$ is aryl, $R^5$ is alkyl,
$R^6$ is an alkylaminocarbo, cycloalkylaminocarbo, aralkylaminocarbo, arylaminocarbo or bicycloalkylaminocarbo, or aryl group,
$R^7$, $R^8$, $R^9$, $R^{10}$ and $R^{11}$ are alkyl or aryl,
$R^{12}$ is alkylaminocarboalkyl, cyanoalkyl, carboxyalkyl, alkoxycarboalkyl, arylaminocarboalkyl, alkyl halide, aryl halide, nitroaryl, or a vinyl group.
m and n may vary between 0 and 12,
a may vary between 5 and 20,
d is at least 1,
wherein a+b+c+d may vary between 30 and 100.

3 Claims, 6 Drawing Figures

CHIRAL POLYSILOXANES, PROCESS FOR THEIR PREPARATION AND USE

The present invention concerns chiral polysiloxanes, a process for their preparation and use.

Polysiloxanes with covalently bonded, chiral residues have recently acquired importance in the gas chromatographic separation of amino acid enantiomers and in quantitative analysis by means of "enantiomer labelling". In particular, in the determination of amino acids in body fluids, such as serum or urine or in water of different origin, heretofore unequalled speed of analysis and accuracies were obtained by means of separation on capillaries with polysiloxanes. Chiral organosiloxanes as stationary phases for the chromatographic separation of optical antipodes are described in DE-OS No. 27 40 019.

One disadvantage of the present state of the art is that the determination of numerous amino acids is rendered difficult by the fact that two amino acid antiomers are eluted together and that the quantification of all amino acids must then be effected in two analytical steps, for example after alternative derivation.

The present invention concerns new polysiloxanes having Formula I:

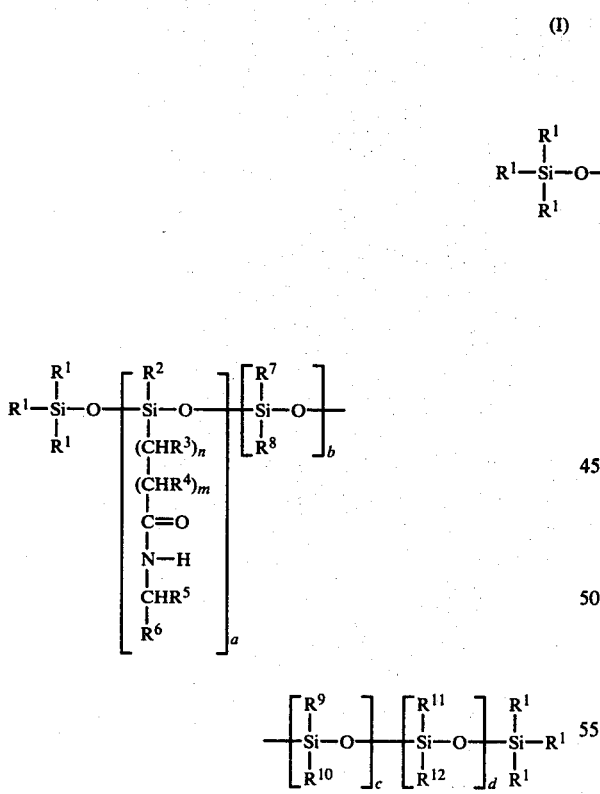

wherein:
$R^1$ and $R^2$ is alkyl,
$R^3$ and $R^4$ are H or an alkyl,
$R^5$ is an alkyl, imidazolylmethyl, indolylmethyl, benzyl, acylamino, or an acylaminobutyl group; and when $R^6$ is aryl, $R^5$ is alkyl,
$R^6$ is an alkylaminocarbo, cycloalkylaminocarbo, aralkylaminocarbo, arylaminocarbo or bicycloalkylaminocarbo, or aryl group,
$R^7$, $R^8$, $R^9$, $R^{10}$ and $R^{11}$ are alkyl or aryl,
$R^{12}$ is alkylaminocarboalkyl, cyanoalkyl, carboxyalkyl, alkoxycarboalkyl, arylaminocarboalkyl, alkyl halide, aryl halide, nitroaryl, or a vinyl group,
m and n may vary between 0 and 12,
a may vary between 5 and 20,
d is at least 1,
wherein a+b+c+d may vary between 30 and 100.

Preferred polysiloxanes of Formula I are provided, wherein:
$R^1$ and $R^2$ are methyl,
$R^3$ and $R^4$ are H, methyl or ethyl,
$R^5$ is methyl, i-propyl, i-butyl, 2-butyl, imidazolylmethyl, indolylmethyl, benzyl, acrylaminopropyl, or acylaminobutyl,
or, when $R^6$ is phenyl or naphthyl, $R^5$ is methyl;
$R^6$ is n-butylaminocarbo, i-butylaminocarbo, ter.-butylaminocarbo, cyclohexylaminocarbo, adamantylaminocarbo, benzylaminocarbo or phenyl or naphthyl,
$R^7$, $R^8$, $R^9$, $R^{10}$ and $R^{11}$ are $C_1$-$C_4$ alkyl group, preferably methyl or phenyl;
$R^{12}$ is a n-butylaminocarbopropyl, n-propylaminocarbobutyl, phenylaminocarbo, trifluoropropyl, cyanopropyl, trichlorophenyl, methoxycarbopropyl, or carboxypropyl group,
and a is preferably 8.

The invention further provides a process for the preparation of the polysiloxanes of Formula I, by reacting a compound of Formula II:

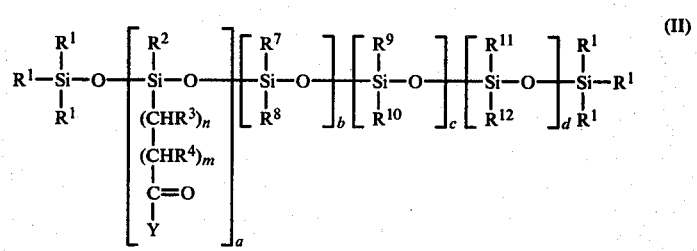

wherein the radicals $R^1$, $R^2$, $R^3$, $R^4$, $R^7$, $R^8$, $R^9$, $R^{10}$, $R^{11}$, and $R^{12}$, together with the indices m, n, a, b, c and d have the above defined meanings and wherein the residue Y, together with the C=O group to which it is bonded, is a carboxyl group or an activated derivative of a carboxyl group which preferably has the following meanings: $-N_3$, $-OR$, $-OCOR$, 0-nitrophenyl, -0-trihalogenphenyl, -0-pentahalogenphenyl,

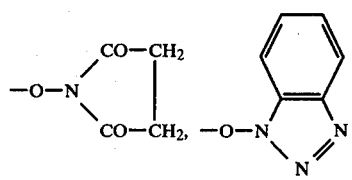

wherein R stands for a, possibly substituted alkyl radical, aralkyl or aryl radical; with a primary amine of Formula III:

$$H_2N-CHR^5R^6 \qquad (III)$$

wherein $R^5$ and $R^6$ are as defined above. If necessary, the reaction is carried out in the presence of a coupling reagent, in particular in the presence of dicyclohexylcarbodiimide or carbonyldiimidazol, or after conversion to an acid chloride, acid anhydride or an activated ester.

The chiral polysiloxanes of Formula I may be used in the separation of optical antipodes, specifically by chromatography, for example, gas chromatography in packed columns or capillaries. The polysiloxanes according to the invention are particularly useful in analytical and preparative separations.

The compounds according to the invention have the particular advantage that by means of the careful correlation of the enantioselectivity and the polarity of the polysiloxanes of Formula I, the superposition of two amino acids is eliminated.

In the known chiral phases the enantioselectivity and the polarity of the stationary phase are determined by the proportion of the achiral and chiral parts of the molecule and cannot be influenced independently. Capillaries charged with such stationary phases exhibit excellent enantioselectivities, but the complete separation of numerous derivatives, preferred for certain reasons, is not feasible for all amino acids.

With the use of the chiral polysiloxanes according to the present invention, the above problem is solved for all N-acylamino acid alkylesters with an arbitrary combination of N-acyl and alkylester groups. The polarity of these chiral polysiloxanes and the relative and absolute retention time of the different amino acids may consequently be varied within a wide range, by balancing poly(carboxyalkyl-alkyl(aryl)-siloxane) and poly(-dialkylsiloxane) with varying amounts of one or several more strongly polar polysiloxanes, such as poly(aryl-alkyl-siloxane), poly(diaryl-siloxane, poly(di(halogenaryl, nitroaryl)siloxane), poly (alkyl(aryl)-cynanoalkyl-siloxane) or poly(alkyl(aryl)-amino-carboalkyl-siloxane) as modifiers, or, the modifiers are mixed in the proportions desired with a given chiral silicone phase. In contrast to the above-mentioned polar "modifiers", siloxanes with carboxyl groups or ester groups are less suitable, as they have insufficient thermal stability.

The terms listed hereinbelow and used in the definitions of the radicals of the compounds of Formula I to III, are further defined as follows:

The term "alkyl" specifically means alkyl radicals with 1 to 20 carbon atoms, preferably alkyl radicals with 1 to 4 carbon atoms, for example methyl, ethyl, n-propyl, i-propyl, n-butyl, i-butyl, 2-butyl, terbutyl.

The term "aryl" means aromatic hydrocarbon radicals, for example phenyl and naphthyl.

The term "aralkyl" includes the above-defined aryl radicals substituted by the above alkyl radicals, an example is benzyl.

"Cycloalkyl" means $C_3$ to $C_8$ rings. Bicyclic alkyl radicals may comprise specifically 7 to 9 carbon atoms in the ring.

The term "halogen" means fluorine, chlorine, bromine and iodine.

Figure 1A:
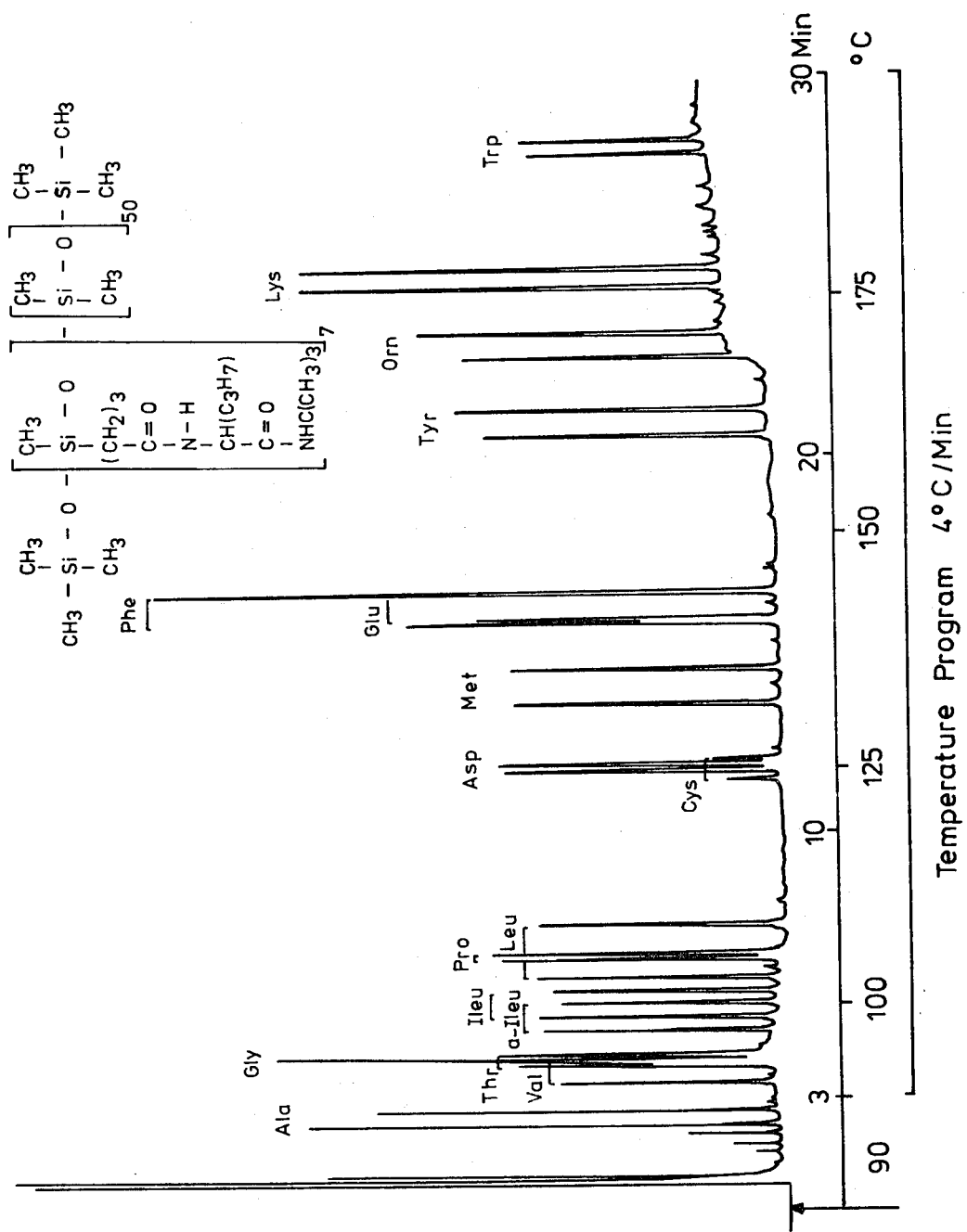
FIGS. 1a to 2b are chromatograms for the chromatographic separation of enantiomeric amino acid mixtures using the chiral polysiloxanes according to the invention and the polysiloxanes of the prior art (DE-OS No. 27 40 019).
Figure 1B:
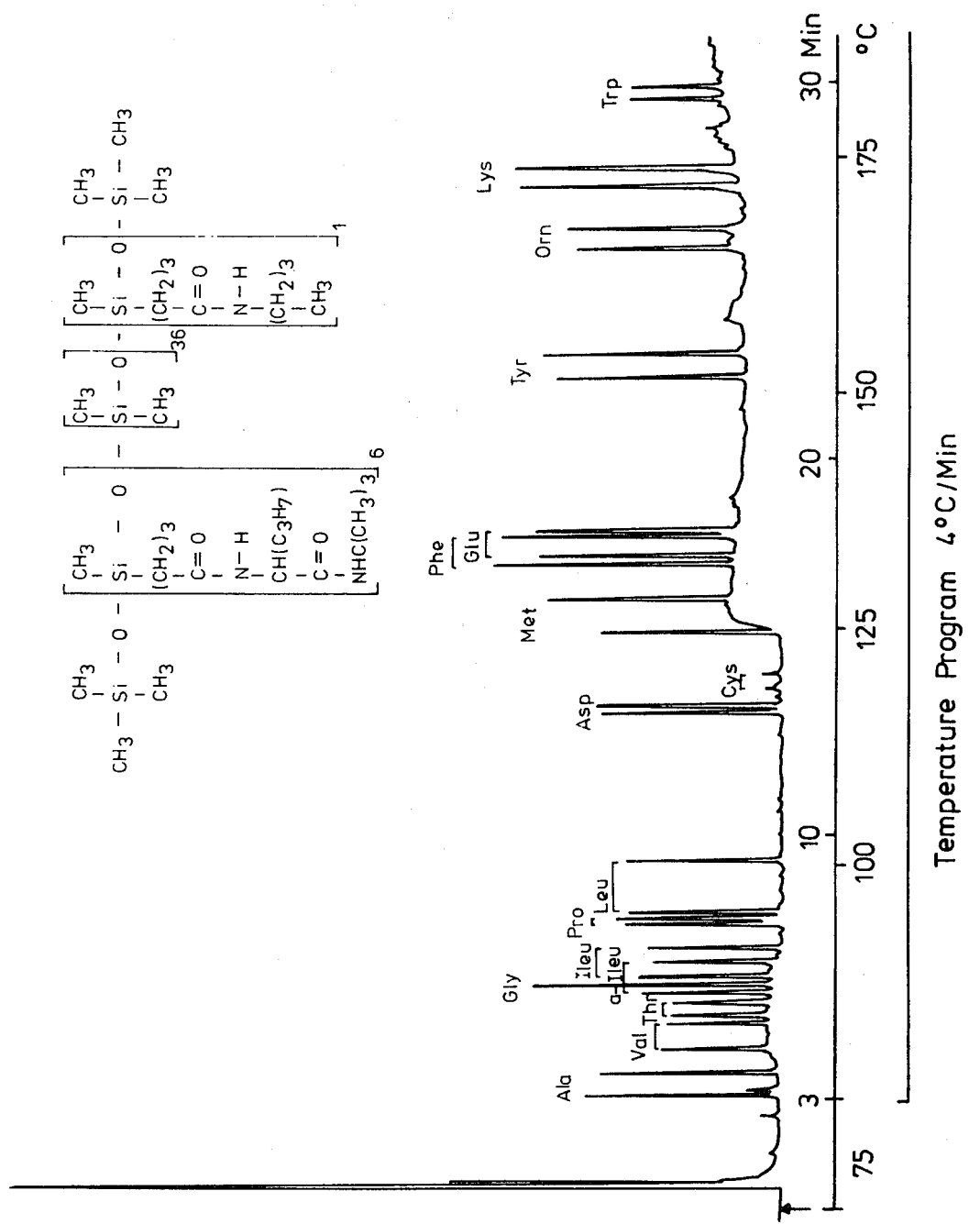

In FIGS. 1a and 1b are chromatograms of amino acid enantiomer mixtures, FIG. 1a was obtained by using a known polysiloxane and FIG. 1b by using a polysiloxane according to the present invention. The following conclusions are drawn from a comparison of the figures:

Using a previously known glass capillary coated with a conventional copolysiloxane with subunits containing a chiral group and dimethylsiloxane subunits, L-valine and glycine and L-phenylalanine and glutamic acid elute together as is seen from FIG. 1a. However, using a capillary coated with a copolysiloxane modified with a third siloxane component in accordance with the present invention, the complete separation of all of the amino acid enantiomers is obtained as is seen from FIG. 1b. Even the poor separation of L-aspartic acid and L-cysteine is significantly better. N(O,S)-pentafluoropropionylamino acid isopropylester was used as the derivative.

Figure 2A:
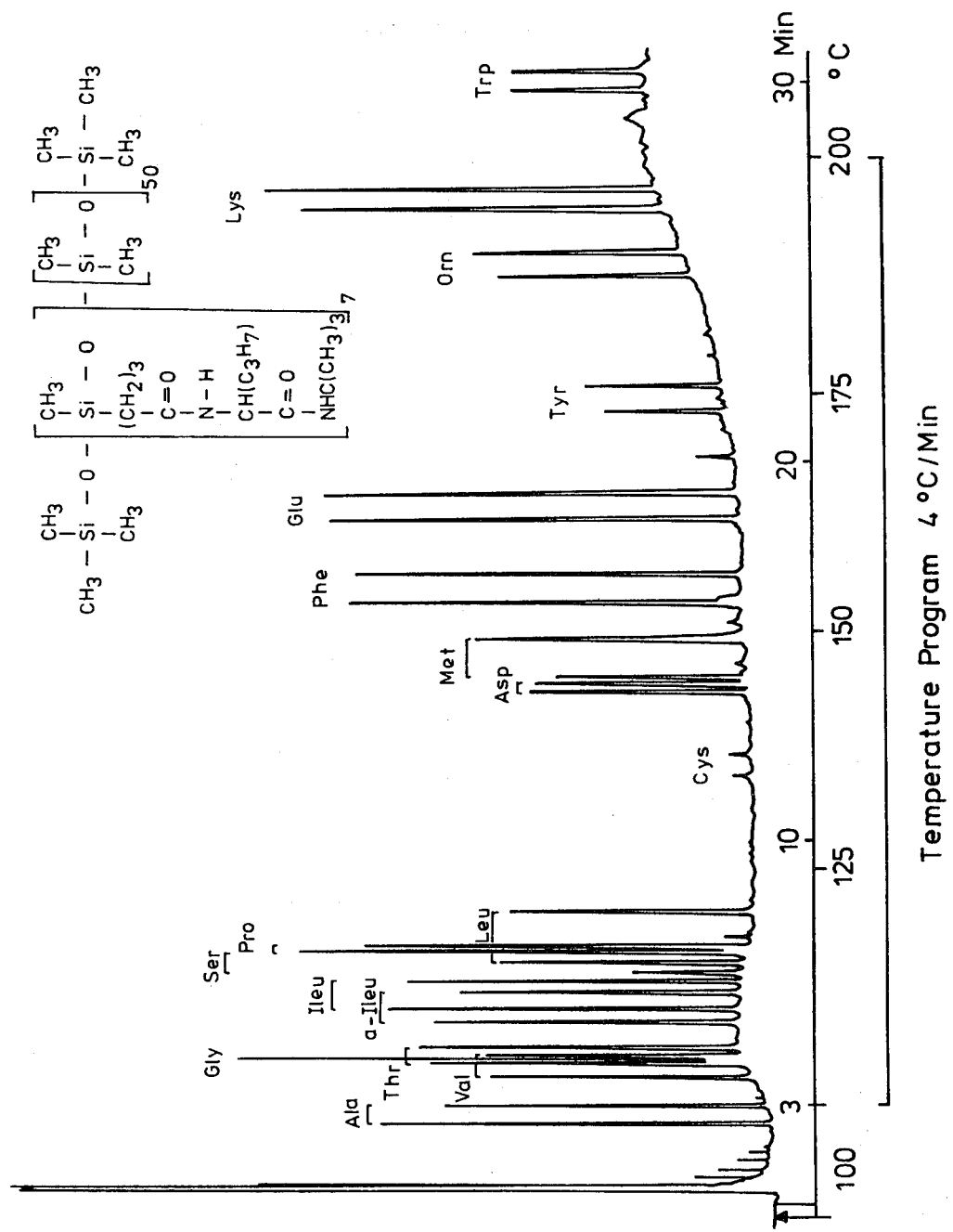
Figure 2B:
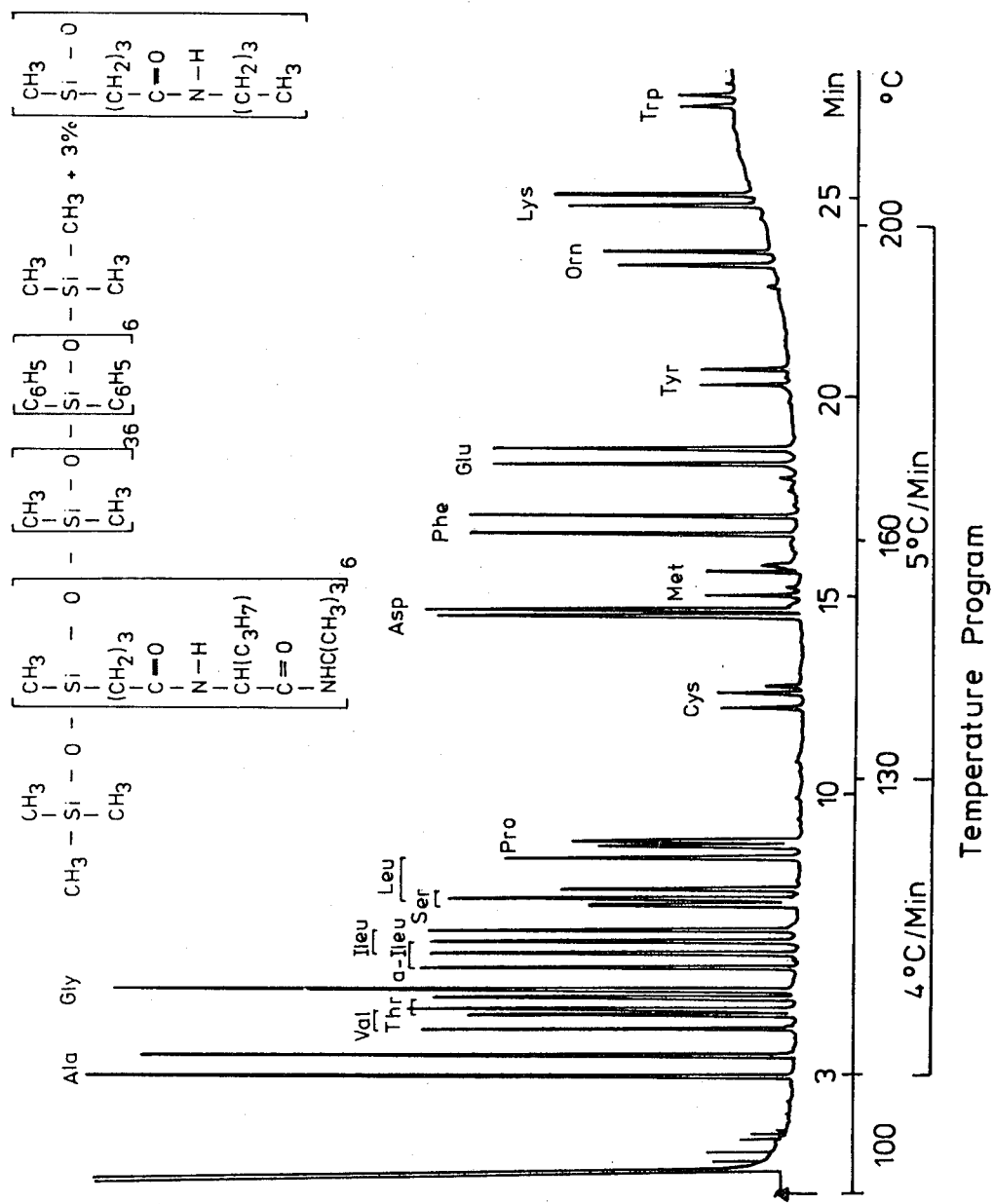

The trifluoroacetylamino acid-n-propylesters are preferred in gas chromatography for different reasons. However, the enantiomeric mixtures of all natural amino acids are not completely separable on the conventional chiral copolysiloxanes obtained from the known two monomers (DE-OS No. 27 40 019, Formula III) shown (FIG. 2a). Previously pentafluoropropionylamino acid isopropyl esters were exclusively used in the gas chromatographic analysis of all amino acid enantiomers. On the contrary, using capillaries coated with a copolymer modified with empirically determined amounts of two additional monomer units in accordance with the present invention, the complete resolution of all N(O,S)-trifluoroacetylamino acid-n-propyl esters may be obtained. Moreover, on conventional copolysiloxanes L-serine and D-proline overlap and D-threonine, glycine and L-valine are separated incompletely only, with the modified chiral polysiloxane of the present invention, a complete separation of all enantiomers is obtained (FIG. 2b).

The polymer, chiral siloxanes modified in this manner are of equal or higher stability than the conventional siloxanes, but are distinguished by the fact that now, in keeping with the separation problem to be expected and the derivative used, a special, tailormade, separation phase is available for gas chromatography.

Figure 3:
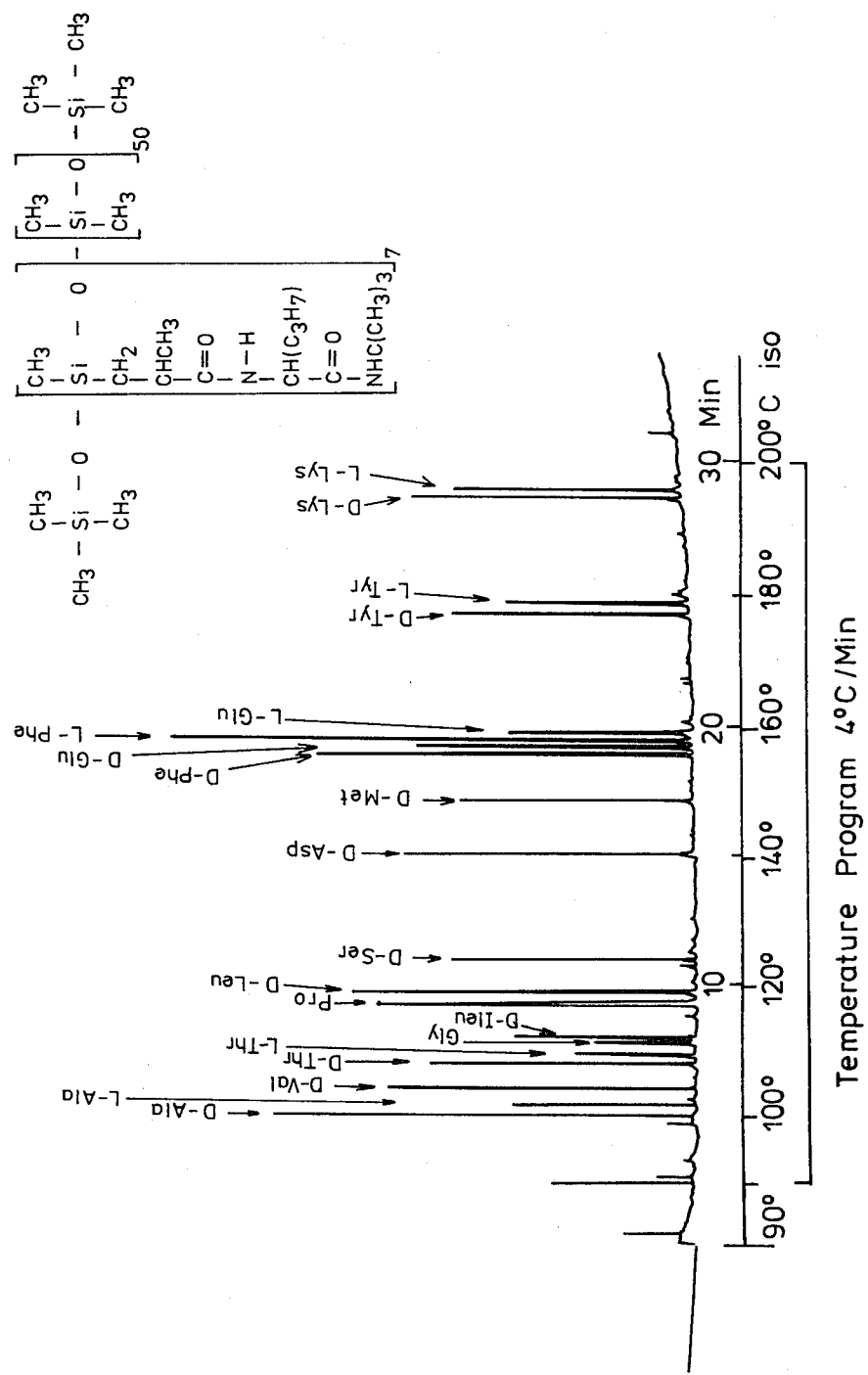
FIG. 3 is a further example of the separation of a hydrolyzed decapeptide using a polysiloxane according to the invention.

FIG. 3 shows a chromatogram obtained in a quantitative analysis of a decapeptide. The mode of operation is as follows:

To a sample of a decapeptide hydrolyzed in the usual manner, a solution of a known concentration of unnatural D-amino acids is added as internal standards. Following the usual conversion to N-pentafluoropropionyl-amino acid-isopropyl esters, an aliquot of the sample is chromatographed in the apparatus according to the invention. The determination of the unknown quantities of the individual L-amino acids is effected by calculating the ratio of the peak areas of the L- and D-enantiomers of an amino acid, multiplied with the amount of D-enantiomers added as the standard. The calculation of the areas is effected by conventional planimetric methods or electronically.

The chromatogram shown in FIG. 1 and obtained with the apparatus to be described hereinbelow, the following composition was determined for the decapeptide examined:

| | Quantity of D-enantiomer added (nmole) | Ratio of peak areas of L to D | Calculated L-enantiomer quantity (nmole) |
| --- | --- | --- | --- |
| Alanine | 162.5 | 0.4135 | 67.2 |
| Threonine | 122.5 | 0.4948 | 60.6 |
| Glycine | — | — | 74.2 |
| Proline | 127.5 | 0.5586 | 71.2 |
| Phenylalanine | 96.1 | 1.342 | 128.9 |
| Glutamic acid | 89.4 | 0.706 | 63.1 |
| Tyrosine | 79.0 | 0.761 | 60.7 |
| Lysine | 75.5 | 0.890 | 67.2 |

Herein, the slight proportion of enantiomeric impurities in the D standards and in the natural L-amino acids has been neglected; this, however, is readily corrected by the introduction of correction factors, if necessary.

Figure 4:
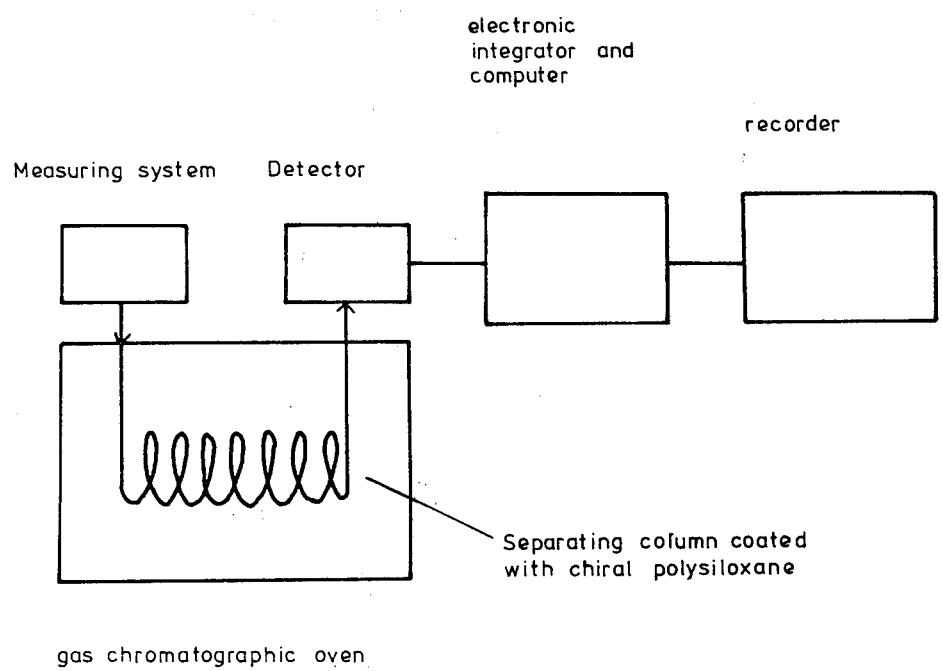
FIG. 4 is a block diagram of an apparatus for the quantitative analysis of amino acids and other optically active substances.

The compounds according to the present invention may be used in the apparatus shown in FIG. 4 for the chromatographic analysis of amino acids. The apparatus consists of a measuring system, a separation capillary with an internal diameter of 0.1 to 0.8 mm and a length of at least 5 m, coated with a chiral phase according to the invention in an oven thermostatable in a range between 20° and 300° C., a detector system customarily used in gas chromatography and a recorder, with or without an electronic evaluating instrument preceding it. The apparatus makes possible a routine, automated quantitative analysis of amino acids in a range of less that 100 pico-moles with high accuracy.

Prior to processing, derivatization and analysis, the unnatural enantiomers of the amino acids are added to the sample as internal standards with identical chemical properties. The latter serve after separation in the apparatus as the reference substances. This mode of operation is also applicable to the quantitative determination of optically active substances with an arbitrary, but known or determinable proportion of the antipodes.

The invention shall be explained in more detail hereinbelow by means of the examples.

EXAMPLE 1

Preparation of a copolysiloxane from subunits of N-(4-methylsiloxyl-butyryl)-L-valine-tert.-butylamide, dimethylsiloxane and n-butylaminocarbopropyl-methylsiloxane (FIG. 1$a$/1$b$, $a=6$, $b=42$, $c=0$, $d=1$):

(a) 540 mg poly(carboxypropyl-methylsiloxane) are dissolved in 4 ml and reacted with 660 mg carbonyldiimidazol. After one hour of agitation at room temperature, 325 mg n-butylamine are added to this mixture. Following agitation over night, the solvent is evaporated in a rotating evaporator. The residue is taken up in 2 ml n-butanol and purified by means of gel permeation chromatography on LH 20 with n-butanol as the eluent. The solvent is removed in a high vacuum at 150° C.

(b) 1.46 g poly(carboxypropyl-methylsiloxane) are mixed with 0.1 ml concentrated sulfuric acid, 0.27 hexamethyldisiloxane and 0.266 g poly(n-butylaminocarbopropyl-methylsilozane) and reacted with 7.74 g dimethyldichlorosilane. The mixture is heated with agitation to 60° C. Subsequently, over a period of approximately 30 minutes, slowly 1.1 g water is added. Following the completion of the water addition, the reaction mixture is further agitated for 2 hours at 110° to 120° C. in order to complete the reaction. The reaction mixture is cooled, taken up in ether or methylene chloride and washed free of chlorides with water. The solvent is drawn off in a vacuum, finally at 12 Torr/100° C. The result is a clear resin that is highly viscous at room temperature.

Note: 0.266 g poly(n-butylaminocarbopropyl-methylsiloxane) correspond to 4.5% by weight of 1.46 g poly(-carboxypropyl-methylsiloxane) and 4.46 g poly(carboxypropyl-methylsiloxane) and 4.44 g poly(dimethylsiloxane).

(c) 350 mg of the copolymer from (b) are dissolved in 3 ml methylenechloride and mixed with 110 mg carbonyldiimidazol. After agitation for one hour at room temperature, 200 mg L-valine-tert.-butylamide-hydrochloride are added and the mixture agitated for 20 hours at room temperature. The organic phase is washed twice with 2 N acetic acid. The solvent is then removed in a rotating evaporator. The residue is taken up in 2 ml n-butanol and purified as in (a) by means of gel permeation chromatography. A 0.15% solution of this stationary phase is used to coat the glass capillary.

EXAMPLE 2

Preparation of a copolysiloxane from subunits of N-(4-methylsiloxybutyryl)-L-valine-tert.-butylamide, dimethylsiloxane and diphenylsiloxane and with the addition of 3% poly(n-butylaminocarbopropyl-methylsiloxane) (FIGS. 2$a$/2$b$, $a=6$, $b=36$, $c=6$):

(a) 1.46 g poly(carboxypropyl-methylsiloxane) are mixed with 0.1 ml concentrated sulfuric acid and 0.27 g hexamethyldisiloxane and subsequently reacted with 7.68 dimethyldichlorosilane and 2.66 g diphenyldichlorosilane. The mixture is heated under agitation to approximately 60° C. Subsequently, over a period of approximately 30 minutes 1.26 g water is added slowly. After heating for two hours to 110°–120° C., subsequent processing is as in (b). The result is a slightly turbid resin that is highly viscous at room temperature.

(b) The copolymer from (a) is coupled with the chiral component in the manner described in Example 1, Item (c) and purified.

(c) 10 mg chiral polysiloxane from (b) and 0.3 g of the modifier of Example 1, Item (a) are dissolved in 9 n 6.86 mg methylenechloride and used to coat the glass capillary.

EXAMPLE 3

Preparation of a copolysiloxane from subunits of N-(4-methylsiloxyl-isobutylril)-L-valine-tert.-butylamide, dimethylsiloxane) are mixed with 0.1 ml concentrated sulfuric acid, 0.27 g hexamethyldisiloxane and reacted with 7.74 g dimethyldichlorosilane. The mixture is heated with agitation to approximately 60° C. Subsequently, over a period of approximately 30 minutes 1.1 g water is added slowly. After heating for two hours to 110°–120°, processing follows in keeping with Example 1, Item (b). The result is a clear resin that is highly viscous at room temperature.

(b) 350 mg of the copolymer of (a) are dissolved in 3 ml methylenechloride and reacted with 13 mg carbonyldiimidazol. After 30 minutes at room temperature 6 mg n-butylamine are added and the mixture agitated for 3 hours. Subsequently, another 100 mg carbonyldiimidazol are added and the mixture agitated for one hour. After the addition of 200 mg L-valine-tert.-butylamidehydrochloride, the mixture is agitated for 20 hours at room temperature. The processing of the preparation is effected as in Example 1, Item (c) by washing with acetic acid and gel permeation chromatography.

EXAMPLE 4

Quantitative determination of the concentration of free amino acids in blood serum:

0.5 ml blood are mixed with an accurately known quantity of 40 to 100 nmole of the D-enantiomers and the amino acids isolated, derivatized in a suitable manner and an aliquot chromatographed in the above-described apparatus. The quantitative calculation is effected planimetrically or electronically.

EXAMPLE 5

Quantitative determination of L-3'-methoxy-4'-hydroxy-phenylglycol (MHPG) in a urine sample:

To a urine sample, an accurately known quantity of D-3'-methoxy-4'-hydroxy-phenylglycol (MHPG) is added as the internal standard. Following suitable separation and derivativization with pentafluoropropionic acid anhydride, an aliquot of the solution is chromatographed in the above-described apparatus. The quantitative calculation of the quantity of the natural L-MHPG present in the sample is effected planimetrically or electronically.

In the above-described Examples 4 and 5, the polysiloxane prepared according to Example 1 was used.

We claim:

1. Chiral polysiloxanes of Formula I:

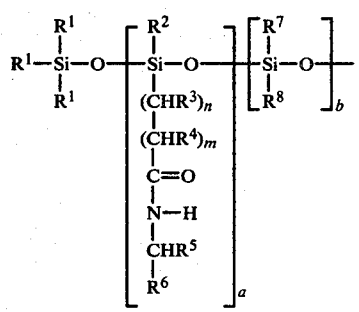

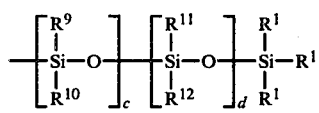

wherein
$R^1$ and $R^2$, which may be the same or different, are $C_{1-20}$ alkyl,
$R^3$ and $R^4$, which may be the same or different, are H or $C_{1-20}$ alkyl,
$R^5$ is $C_{1-20}$ alkyl, imidazolylmethyl, indolylmethyl, benzyl, acylaminopropyl, acylaminobutyl, and when $R^6$ is phenyl or naphthyl, $R^5$ is $C_{1-20}$ alkyl,
$R^6$ is an $C_{1-20}$ alkylaminocarbonyl, $C_{3-8}$ cycloalkylaminocarbonyl, ar $C_{1-20}$ alkylaminocarbonyl, where ar is phenyl or naphthyl, arylaminocarbonyl where aryl is phenyl or naphthyl; $C_{7-9}$ bicycloalkylaminocarbonyl, naphthyl or phenyl,
$R^7$, $R^8$, $R^9$, $R^{10}$ and $R^{11}$ which may be the same or different and are $C_{1-20}$ alkyl, naphthyl or phenyl;
$R^{12}$ is $C_{1-20}$ alkylaminocarbonyl $C_{1-20}$ alkyl, cyano $C_{1-20}$ alkyl, carboxy $C_{1-20}$ alkyl, $C_{1-20}$ alkoxycarbonyl $C_{1-20}$ alkyl, naphthylaminocarbonyl $C_{1-20}$ alkyl, phenylaminocarbonyl $C_{1-20}$ alkyl, $C_{1-20}$ alkylhalide, naphthylhalide, phenylhalide, nitronaphthyl, nitrophenyl or a vinyl group,
m and n are between 0 and 12,
a may vary between 5 and 20,
d is at least 1,
and a+b+c+d varies between 30 and 100.

2. The chiral polysiloxanes according to claim 1, wherein:
$R^1$ and $R^2$ are both methyl,
$R^3$ and $R^4$ are H, methyl or ethyl,
$R^5$ is methyl, i-propyl, i-butyl, 2-butyl, imidazolylmethyl, indolylmethyl, benzyl, acylaminopropyl, or acylaminobutyl,
or, when $R^6$ is phenyl or naphthyl, $R^5$ is methyl,
$R^6$ is n-butylaminocarbonyl, i-butylaminocarbonyl, tert.-butylaminocarbonyl, cyclohexylaminocarbonyl, adamantylaminocarbonyl, benzylaminocarbonyl, phenyl or naphthyl,
$R^7$, $R^8$, $R^9$, $R^{10}$ and $R^{11}$ are for $C_1$–$C_4$-alkyl, naphthyl or phenyl,
$R^{12}$ stands for n-butylaminocarbonylpropyl, n-propylaminocarbonylbutyl, phenylaminocarbonyl, trifluoropropyl, cyanopropyl, trichlorophenyl, methoxycarbonylpropyl, or carboxypropyl,
and a is 8.

3. A process for the preparation of the compounds of the formula I according to claim 1 which comprises reacting a compound of Formula II:

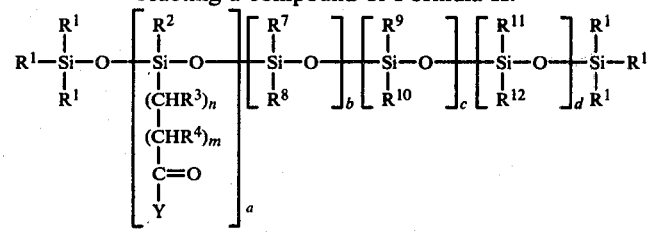

wherein the radicals $R^1$, $R^2$, $R^3$, $R^4$, $R^7$, $R^8$, $R^9$, $R^{10}$, $R^{11}$ and $R^{12}$, and the indices m, n, a, b, c, and d have the meaning recited in claim 1 and wherein $Y_1$ together with the C=O groups to which it is bonded, is a carboxyl group, an activated derivative of a carboxyl group, —$N_3$, —OR, —OCOR, O-nitrophenyl, —O-trihalogenphenyl,

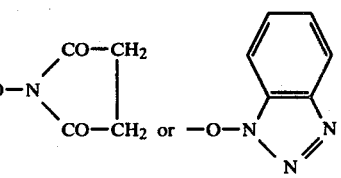

-O-pentahalogenphenyl, wherein R is an $C_{1-20}$ alkyl radical, naphthyl $C_{1-20}$ alkyl, phenyl $C_{1-20}$ alkyl, naphthyl or phenyl; is reacted with a primary amine of the following formula III:

$$H_2N-CHR^5R^6 \qquad (III)$$

wherein $R^5$ and $R^6$ have the meaning specified in claim 1, possibly in the presence of a coupling reagent which is dicyclohexylcarbodiimide or carbonyldiimidazol.

* * * * *